3,344,589
SECONDARY SYSTEM FOR DUST COLLECTOR
Tom R. Smith, Louisville, Ky., assignor to American Air Filter Company, Inc., Louisville, Ky., a corporation of Delaware
Filed Sept. 14, 1966, Ser. No. 579,314
4 Claims. (Cl. 55—294)

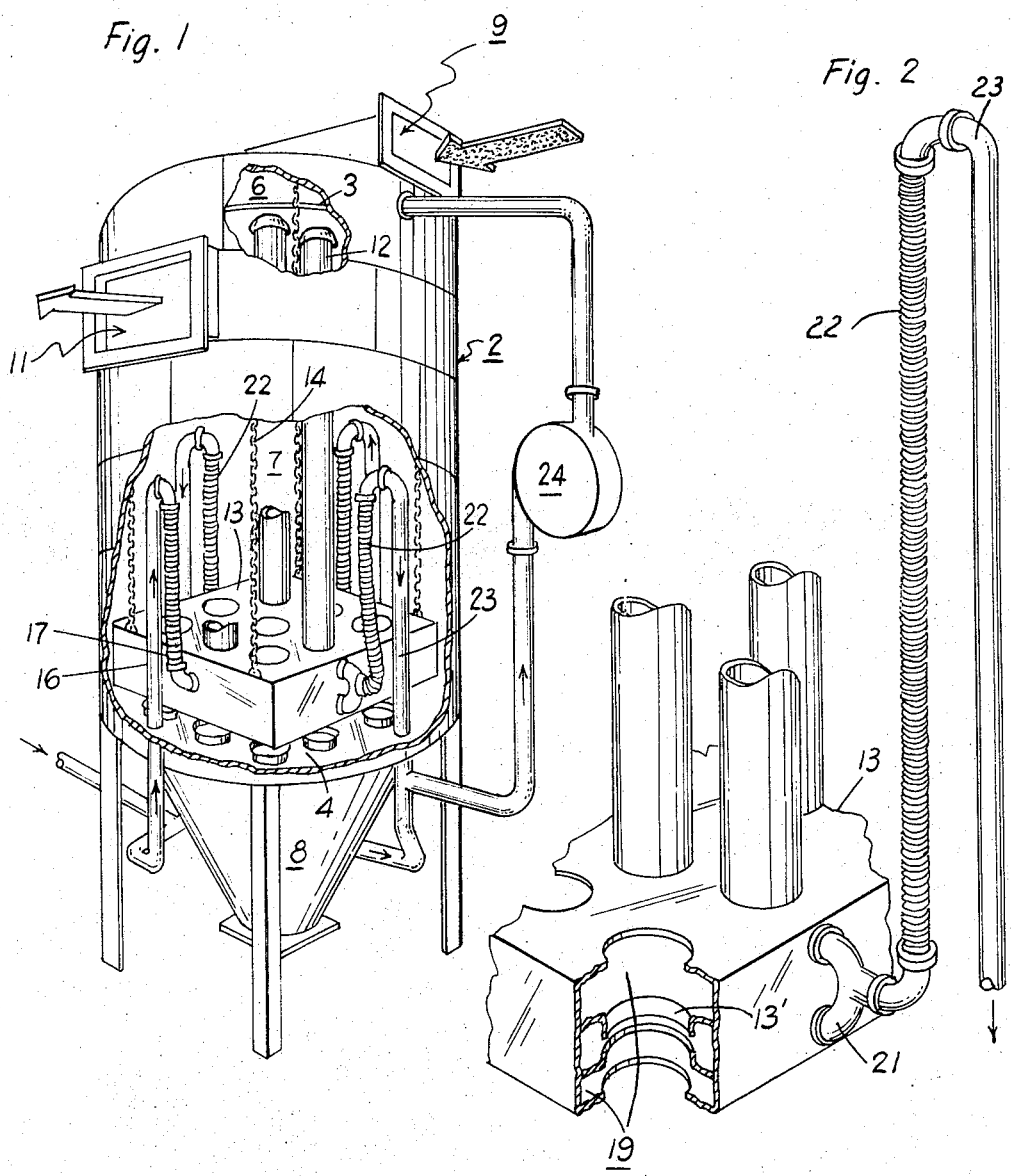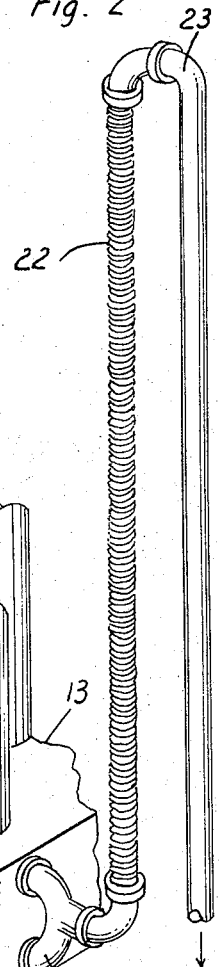

The present invention relates to dust collectors of the gas permeable tubular fabric type and more particularly to an improved secondary air system for dislodging contaminant particles collected on the interior surfaces of the tubes of such collectors.

It long has been known in the art of dust collecting to pass a dirty gas stream through one or more gas permeable filter tubes extending between a supply header and a dust hopper, the gas to be cleaned flowing from the header through the walls of the filter tubes with contaminant particles in the gas depositing on the interior surfaces of the tubes or falling into the hopper. To remove dust deposited on the interior surfaces of the tubes, reverse blow ring means is arranged to traverse the tubes periodically, the blow ring means directing a stream of secondary air against the exterior surfaces of the tubes to dislodge contaminants collected on the interior tube surfaces.

In accordance with the present invention, it has been noted that a certain amount of contaminant particles collect adjacent to and near the exterior tube surfaces. Accordingly, when the reverse blow ring means traverses the tubes, these particles frequently are dislodged or so loosened on the tube fabric that when the dirty gas stream is subsequently passed through the tubes, these particles are entrained in the clean gas stream which emits from the tubes.

The present invention recognizing that this situation lowers the over-all cleaning efficiency of the filter tubes provides a means for insuring that these particles are entrained in a ready manner as the reverse blow ring frame means traverses the tubes so that the particles can be exhausted and recycled if desired into the dirty gas stream for proper filtering purposes.

It is to be understood that various other features of the present invention will become obvious to one skilled in the art upon reading the disclosure set forth hereinafter.

More particularly, the present invention provides a dust collector comprising: a housing having spaced dirty gas inlet means and clean gas outlet means; vertically extending gas cleaning tube means disposed within the housing in communication with the dirty gas inlet means and the clean gas outlet means whereby dirty gas can be introduced from the dirty gas inlet means into and passed through the tube means to separate contaminant particles therefrom with the clean gas passing to the clean gas outlet means; reverse blow ring frame means adapted to longitudinally traverse the tube means, the reverse blow ring frame means including an inlet opening to receive clean air from a clean air source and an outlet opening to direct such clean air against the side of the gas cleaning tube means for reverse cleaning of the tube means; and hood means cooperable with the reverse blow ring frame means along the same side of the tube means as the reverse blow ring frame means to entrain particulate materials shaken from the tube means by the blow ring frame means as it traverses the tube means.

It is to be understood that various changes can be made in the arrangement, form, and construction of the apparatus disclosed herein without departing from the scope or spirit of the present invention.

Referring to the drawing which discloses one advantageous embodiment of the present invention:

FIGURE 1 is an over-all partially broken away perspective view of a tubular type dust collector incorporating the improved secondary air system of the present invention; and FIGURE 2 is an enlarged detailed isometric view of a portion of a blow ring frame means disclosing the improved hood arrangement for entraining dust particles released from the exterior surfaces of the tube means as the blow ring frame means traverses the tube means.

Referring to FIGURE 1 of the drawing, dust collector housing 2, the main body portion of which advantageously can be of cylindrical form, is disclosed. Arranged to extend transversely across housing 2 in spaced parallel relationship to each other are upper and lower tube header plates 3 and 4, respectively. Tube header plates 3 and 4 divide housing 2 into dirty gas plenum 6 above upper header plate 3, gas treating plenum 7 between spaced header plates 3 and 4 and dust hopper 8 below lower header plate 4. It is to be noted that dirty gas plenum 6 is provided with dirty gas inlet 9 and gas treating plenum 7 is provided with spaced clean gas outlet 11.

treating plenum 7 is provided with spaced clean gas
Mounted in vertically extending position to connect suitably spaced openings in upper tube header plate 3 with aligned and similarly spaced openings in lower tube header plate 4 are a series of gas pervious fabric tubes 12. Tubes 12 are arranged to pass through apertures in blow ring frame 13, which frame is moved vertically in a periodic manner along the length of the tubes through suitable chain drive mechanism 14 (not shown in detail). As the frame is moved, high pressure air is discharged at certain preselected intervals against the exterior tube surfaces dislodging dust from the interior surfaces of the tubes, the dislodged dust falling into hopper 8. In order to supply clean air to blow ring frame 13, a pair of clean air supply riser conduits 16 are mounted to project vertically upward from the lower tube header plate 4 in spaced relationship on either side of blow ring frame 13. Each of conduits 16 is connected at its lower end to a suitable high pressure air supply (not shown) to receive clean secondary air at preselected intermittent periods during reverse blowing operations. At the opposite end, each conduit 16 is provided with a draped hose device 17, one end of such hose device being connected to a conduit 16 and the other end being connected to blow ring frame 13. It is to be understood that other types of arrangements known in the art can be utilized to supply the secondary air system to the blow ring frame means if so desired.

In accordance with the present invention, it has been noted that, as blow ring frame 13 traverses up and down the length of tubes 12, contaminant particles collected on and adjacent the exterior surface of tubes 12 are dislodged, causing these particles to be subsequently entrained in the clean gas stream passing through the tubes. To eliminate such entrainment and to enhance and increase the efficiency of the over-all unit, the present invention provides a modified blow ring frame means 13 of a nature so that the casing thereof provides plenum chambers 19 on opposite sides of blow ring 13' (FIGURE 2). Connected to plenums 19 which serve as exhaust hoods for the contaminant particles collected from the exterior surfaces of tubes 12 is a recirculating system which includes a pair of oppositely disposed forked couplings 21 (only one of which is shown), which in turn are each connected to draped hose members 22 at one end thereof, the other end of draped hose members 22 being in turn connected to riser conduits 23. The conduits 23 in the advantageous embodiment of the present invention are, in turn, connected to each other and then to the dirty air side 6 of the dust collector system. It is to be noted that a suitable low pressure blower 24 can be supplied in the recirculating system to insure that the exhaust contaminant particles are properly recirculated. To avoid any possible short circuiting effect on the reverse blow ring, blower 24 is maintained at a pressure lower than the pressure of the reverse blow ring device.

The invention claimed is:

1. A dust collector comprising: a housing having spaced dirty gas inlet means and clean gas outlet means; vertically extending gas cleaning tube means disposed within said housing in communication with said dirty gas inlet means and said clean gas outlet means whereby dirty gas can be introduced from said dirty gas inlet means into and passed through said tube means to separate contaminant particles therefrom with the clean gas passing to said clean gas outlet means; reverse blow ring frame means adapted to longitudinally traverse said tube means, said reverse blow ring frame means including an inlet opening to receive clean air from a clean air supply and an outlet opening to direct such clean air against the side of said gas cleaning tube means for reverse cleaning of said tube means; and hood means cooperable with said reverse blow ring frame means along the same side of said tube means to entrain particulate material shaken from said tube means by said blow ring frame means as it traverses said tube means.

2. The apparatus of claim 1, said hood means including exhaust plenums disposed on opposite sides of said blow ring frame means.

3. The apparatus of claim 1, and recirculating means cooperative with said hood means to recirculate the entrained particulate materials from said hood means to said dirty gas inlet of said housing.

4. The apparatus of claim 3 and a low pressure blower means disposed in said recirculating means to effect said recirculation.

References Cited
UNITED STATES PATENTS

| | | | |
|---|---|---|---|
| 2,516,680 | 7/1950 | Cupepper | 55—294 X |
| 2,729,304 | 1/1956 | Swanson | 55—294 |
| 2,738,856 | 3/1956 | Perlis | 55—294 |
| 2,758,671 | 8/1956 | Silverman et al. | 55—294 X |
| 3,173,776 | 3/1965 | Palmore | 55—294 |
| 3,256,679 | 6/1966 | Snyder | 55—302 |

HARRY B. THORNTON, *Primary Examiner.*

S. SOKOLOFF, *Assistant Examiner.*